US006980703B2

(12) United States Patent
Araki

(10) Patent No.: US 6,980,703 B2
(45) Date of Patent: Dec. 27, 2005

(54) INFORMATION STORAGE APPARATUS AND ARTICLE OF MANUFACTURE

(75) Inventor: Katsuhiko Araki, Hamura (JP)

(73) Assignee: Kabushiki Kaisha Toshiba, Tokyo (JP)

(*) Notice: Subject to any disclaimer, the term of this patent is extended or adjusted under 35 U.S.C. 154(b) by 586 days.

(21) Appl. No.: 10/067,407

(22) Filed: Feb. 7, 2002

(65) Prior Publication Data

US 2002/0107587 A1 Aug. 8, 2002

(30) Foreign Application Priority Data

Feb. 8, 2001 (JP) ............................ 2001-032700

(51) Int. Cl.[7] ............................ G06K 9/54

(52) U.S. Cl. ...................... 382/305; 382/232; 382/235; 382/239

(58) Field of Search ............................ 382/305, 232, 382/235, 240, 242, 239, 248, 264, 244; 375/240.15; 348/699, 54, 58; 349/15, 96, 98; 355/18, 355/40, 77

(56) References Cited

U.S. PATENT DOCUMENTS

| | | | | |
|---|---|---|---|---|
| 5,032,927 A * | 7/1991 | Watanabe et al. | ........... | 386/101 |
| 5,537,144 A * | 7/1996 | Faris | ........... | 348/58 |
| 5,699,370 A * | 12/1997 | Kaniwa et al. | ........... | 714/811 |
| 5,708,473 A * | 1/1998 | Mead | ........... | 375/240.15 |
| 6,282,041 B1 * | 8/2001 | Blumenau | ........... | 360/48 |
| 6,313,902 B1 * | 11/2001 | Enomoto | ........... | 355/18 |
| 6,314,206 B1 * | 11/2001 | Sato | ........... | 382/235 |
| 6,321,293 B1 * | 11/2001 | Fabrizio et al. | ........... | 711/113 |
| 6,359,664 B1 * | 3/2002 | Faris | ........... | 349/15 |
| 6,421,464 B1 * | 7/2002 | Tran et al. | ........... | 382/232 |
| 6,504,995 B1 * | 1/2003 | Benear et al. | ........... | 386/111 |
| 6,771,829 B1 * | 8/2004 | Topiwala et al. | ........... | 382/240 |

FOREIGN PATENT DOCUMENTS

| | | | | |
|---|---|---|---|---|
| EP | 0700214 A2 * | 3/1996 | ............ | H04N 7/26 |
| JP | 363066765 A * | 3/1988 | ............ | G11B 20/10 |
| JP | 09-322110 | 12/1997 | ............ | H04N 5/91 |
| JP | 11-191879 | 7/1999 | ............ | H04N 5/92 |
| JP | 2000-209529 | 7/2000 | ............ | H04N 5/76 |

OTHER PUBLICATIONS

Pegler et al., "Scalability Issues for Mass Multimedia Storage Systems", IEEE Colloquilium on Mass Storage Systems, Nov. 1996, pps. 1/1-1/7.*

Sun et al., "MPEG Video Coding with Temporal Scalability", IEEE, vol. 3, Jun. 1995, pps. 1742-1746.*

English Translation of the Decision of Rejection from Japanese Patent Office mailed on Nov. 26, 2004.

* cited by examiner

*Primary Examiner*—Anh Hong Do
(74) *Attorney, Agent, or Firm*—Finnegan, Henderson, Farabow, Garrett & Dunner, L.L.P.

(57) ABSTRACT

An information storage apparatus comprises a storage device which stores digital data, an input device which sets a compression ratio of the stored data, and a writing device which writes the set compression ratio as additional data for the stored digital data to the storage device.

12 Claims, 6 Drawing Sheets

INFORMATION STORAGE APPARATUS AND ARTICLE OF MANUFACTURE

CROSS-REFERENCE TO RELATED APPLICATIONS

This application is based upon and claims the benefit of priority from the prior Japanese Patent Application No. 2001-032700, filed Feb. 8, 2001, the entire contents of which are incorporated herein by reference.

BACKGROUND OF THE INVENTION

1. Field of the Invention

The present invention relates to an information storage apparatus having a capability of saving data and an article of manufacture.

2. Description of the Related Art

Conventionally, examples of the information storage apparatus include a digital camera, a digital video recorder, a digital sound recorder, etc. A storage medium used for the information storage apparatus has a limited capacity. An available free space may be insufficient when new digital data needs to be saved. If the storage medium is removable, such as a floppy disk, a memory card, etc., it just needs to be replaced with a new one. Even if the storage medium is not removable, such as a hard disk, it is possible to transfer part or all of the saved data to other apparatuses. When data is transferred to other apparatuses, that data is not lost. It is possible to increase a free space by deleting the transferred data. However, for example, if other apparatuses are not available at a place where one has gone, or if transfer means is not available, it is necessary to delete part or all of the currently saved data. There is no problem in deleting data if it is unnecessary. However, it is difficult to determine data to be deleted in a short time. There have been cases where necessary data is deleted inadvertently. Further, it has been difficult to easily estimate how much free space is made available by deletion of the data.

The conventional information storage apparatus has the following drawback. Namely, when the storage medium is not removable or data cannot be transferred to other apparatuses, if there is insufficient free space, some data must be deleted when storing new data.

BRIEF SUMMARY OF THE INVENTION

According to an embodiment of the present invention, an apparatus comprises a storage device which stores digital data, an input device which sets a compression ratio of stored data, and a writing device which writes the specified compression ratio as additional data for the digital data to the storage device.

According to an embodiment of the present invention, an article of manufacture comprising a computer usable medium having computer readable program code means embodied therein, the computer readable program code means comprises computer readable program code means for causing a computer to store digital data, computer readable program code means for causing a computer to set a compression ratio of the stored digital data, and computer readable program code means for causing a computer to write the set compression ratio as additional data for the stored digital data.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of an information storage apparatus according to the present invention will now be described with reference to the accompanying drawings.

Figure 1:
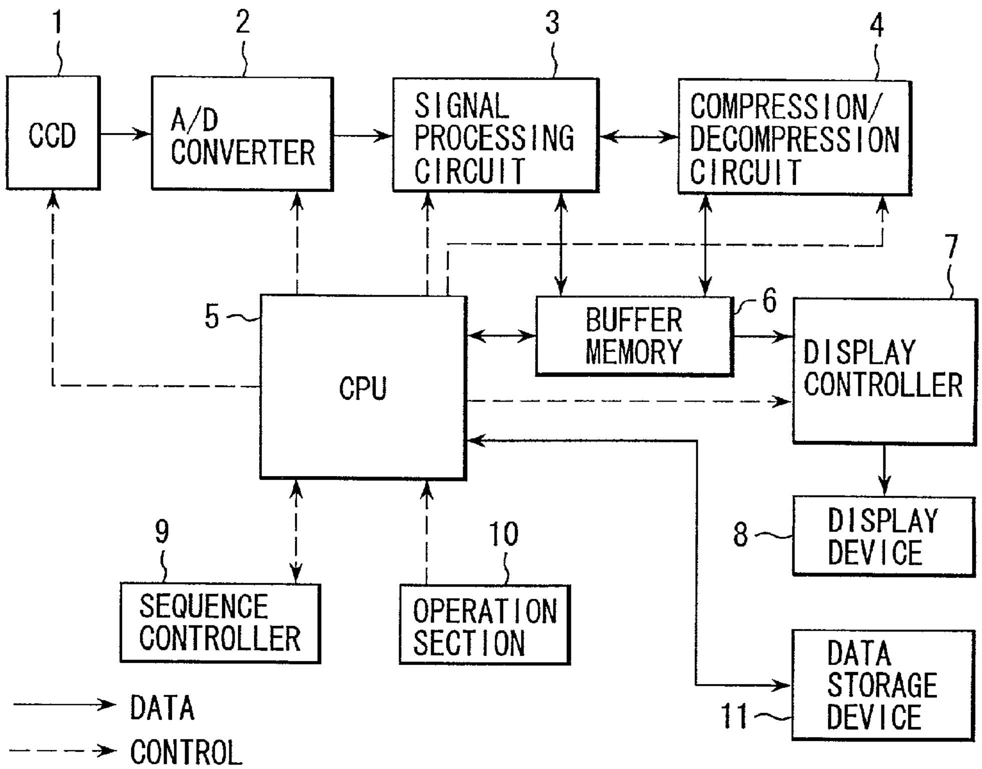
FIG. 1 is a block diagram showing the configuration of a digital camera as a first embodiment of the information storage apparatus according to the present invention.

FIG. 1 shows the configuration of a digital camera as an information storage apparatus according to a first embodiment of the present invention.

An output from a charge-coupled device (CCD) 1 is supplied to a signal processing circuit 3 via an analog-to-digital (A/D) converter 2. The CCD 1 may comprise a single-plate type CCD or three-plate type CCDs. The CCD 1 outputs color signals such as R, G and B signals. The signal processing circuit 3 performs various image processes on these output color signals to generate image data. The signal processing circuit 3 outputs bitmap image data. A compression-decompression circuit 4 compresses the bitmap image data, e.g., in a joint photographic experts group (JPEG) format. The compressed image data is supplied to a data storage apparatus 11 and is saved here. A buffer memory 6 is connected to the signal processing circuit 3 and compression-decompression circuit 4. The data storage apparatus 11 comprises a semiconductor memory, hard disk, memory card, optical disk, etc.

Normally, the compression-decompression circuit 4 compresses only the output from the signal processing circuit 3. The compression-decompression circuit 4 according to the present invention can further compress (recompress) previously saved image data (compressed data) in order to increase the free space (the capacity capable of storing data) in the data storage apparatus 11. Each time recompression is performed, image data may be selected and a compression ratio, a compression method, etc. may be specified. However, it is desirable to previously set information about recompression of the image data, attach this information as additional information to the image data, and automatically perform recompression based on the attached additional information. The recompression ratio does not mean a compression ratio with regard to an original image, but a compression ratio with regard to a compressed image stored in the data storage apparatus 11. However, the recompression ratio is not limited thereto, and may be a compression ratio with regard to the original image.

Figure 2:
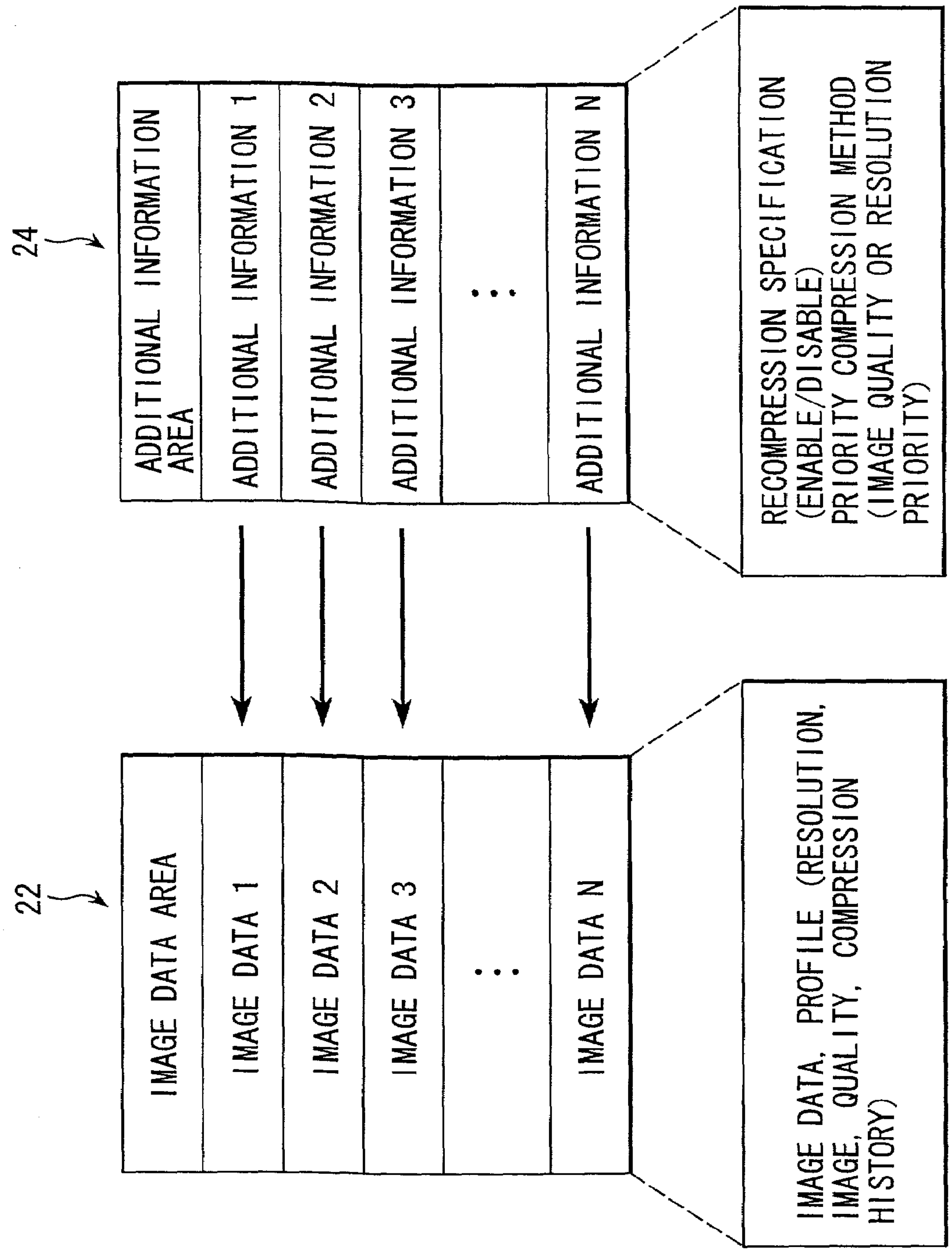
FIG. 2 is a schematic diagram showing the data structure of the data storage apparatus.

FIG. 2 shows a schematic diagram of the data storage apparatus 11. Additional information 24 is stored to be associated with image data 22 for each frame. The image data 22 includes an image data profile in addition to image data itself. The profile includes a resolution (size), image quality, and a compression history of image data. The additional information 24 includes recompression availability, a priority compression method, and recompression ratio specification. The recompression availability specifies whether image data is allowed to be recompressed or not. The priority compression method includes the image quality priority and the resolution priority. The image quality priority compresses data just by decreasing the resolution without degrading the image quality. The resolution priority compresses data just by degrading the image quality without decreasing the resolution. The recompression ratio ranges from 0 to 100%.

Returning to FIG. 1, a display device 8 displays image data for determining a composition during an image pickup. The display device 8 also functions as a viewfinder. For this purpose, a display controller 7 is connected between the buffer memory 6 and the display device 8. The display device 8 also displays images saved in the data storage apparatus 11 when the recompression information (to be described) is modified.

The above-mentioned components are controlled by a central processing unit (CPU) 5 which includes a read only memory (ROM) for storing a program. The CPU 5 is connected to a sequence controller 9 and an operation section 10. The sequence controller 9 controls an image pickup sequence. The operation section 10 includes a key switch, a touch switch, etc. for setting or entering various types of information such as the above-mentioned additional information.

Figure 3:
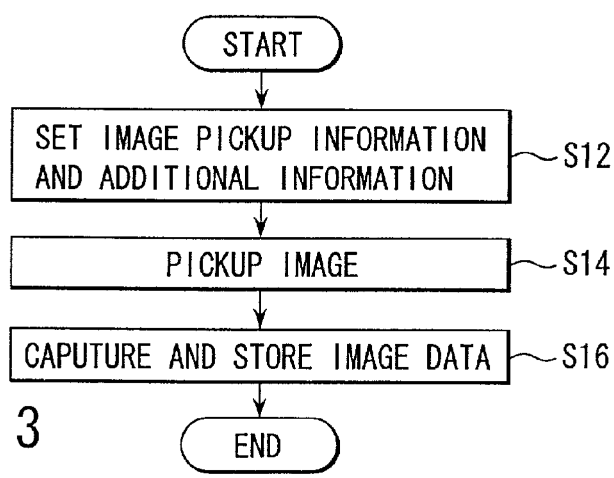
FIG. 3 is a flowchart showing an image pickup operation.

An image pickup operation is described with reference to the flowchart in FIG. 3.

Figure 4:
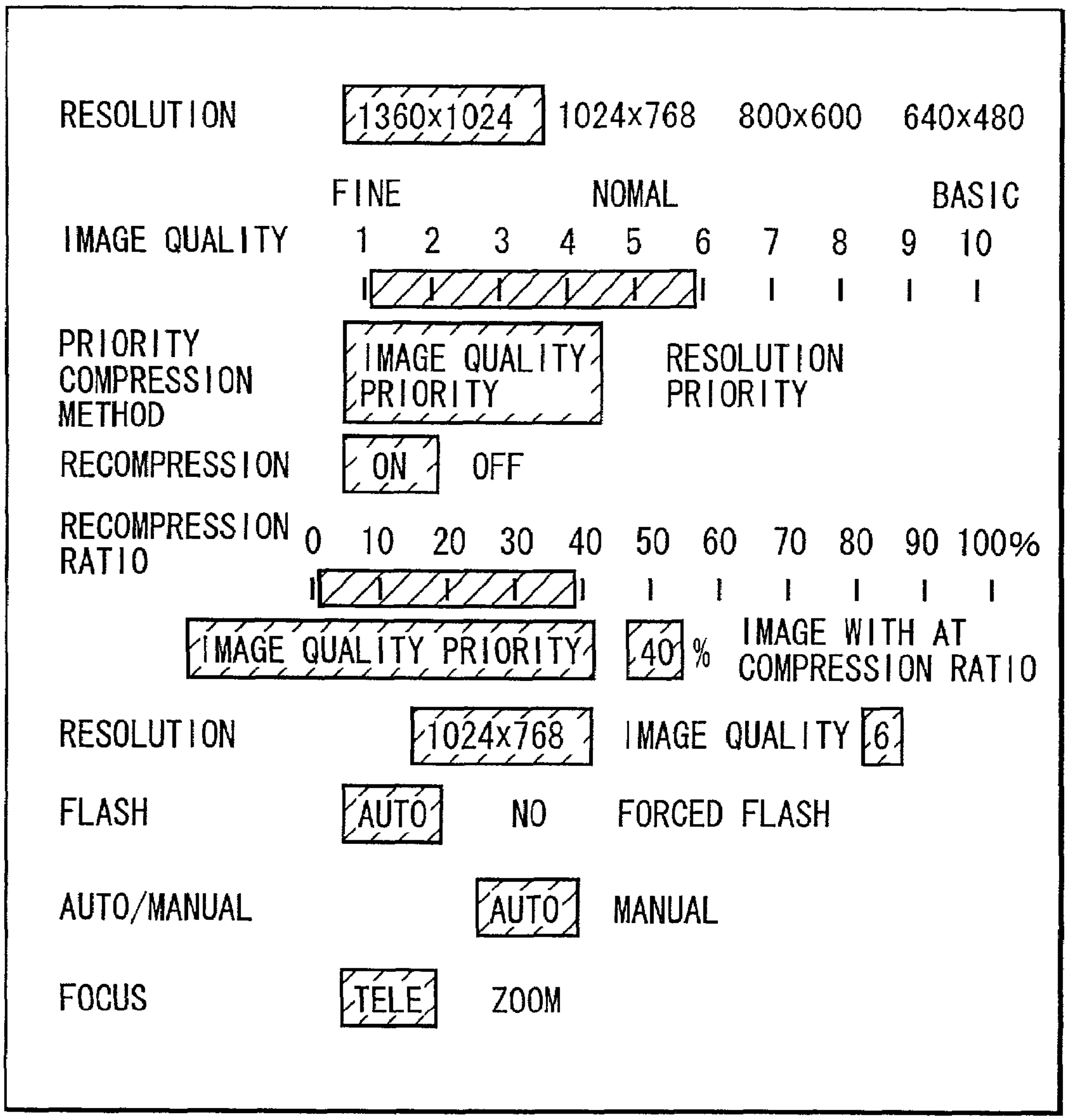
FIG. 4 shows a user interface screen for setting image pickup information and additional information.

Before image pickup, image pickup information and additional information are set at step S12. For this setting, the display device 8 displays a screen as shown in FIG. 4. The setup items include resolution, image quality, priority compression method, recompression, recompression ratio, flash, auto/manual (exposure), focus, etc. The resolution can be selected from 1360×1024, 1024×768, 800×600, and 640×480. The image quality can be selected from 10 grades (the smaller the number, the higher the quality). The resolution and the image quality are associated with the amount of image data. Accordingly, if the same resolution is used, the different image quality causes a different data amount. If the same image quality is used, the different resolution causes a different data amount. The priority compression method specifies whether to prioritize the image quality (not changing the image quality) or the resolution (not changing the resolution) during recompression. The recompression item specifies whether or not to recompress the current frame image. When the recompression is impossible, the recompression ratio is set to 0%. Setting the compression ratio to 100% means deleting the current frame image during recompression.

Determining the priority compression method and the recompression ratio represents the resolution and the image quality after recompression. This embodiment shows these items as a target for determining the recompression ratio. For example, an image has the resolution of 1306×1024 and the image quality of 6. When this image is recompressed 40% with the image quality priority specified, it is found that the resulting image will have the resolution of 1024×768 and the image quality of 6. Since the resolution values are limited, it may be preferable to first determine the resolution without setting the recompression ratio and allow the recompression ratio to be determined according to the resolution when the image quality is prioritized.

As image pickup conditions, the flash is set to auto; the auto/manual is set to auto (automatic exposure); and the focus is set to telephoto. Of these items, the resolution, the image quality, the flash, the auto/manual, and the focus are image pickup information. The priority compression method, the recompression, and the recompression ratio are additional information. The resolution and the image quality are stored as an image data profile.

As mentioned above, the additional information about the recompression is predetermined and is saved in association with image data. This prevents a necessary image from being deleted or recompressed inadvertently during execution of the recompression and easily enables the recompression of only desired images with the preferred method.

At step S14, a single image is picked up on the condition according to the set image pickup information. At step S16, this image data is stored in the storage apparatus 11 with the information set at step S12.

Figure 5:
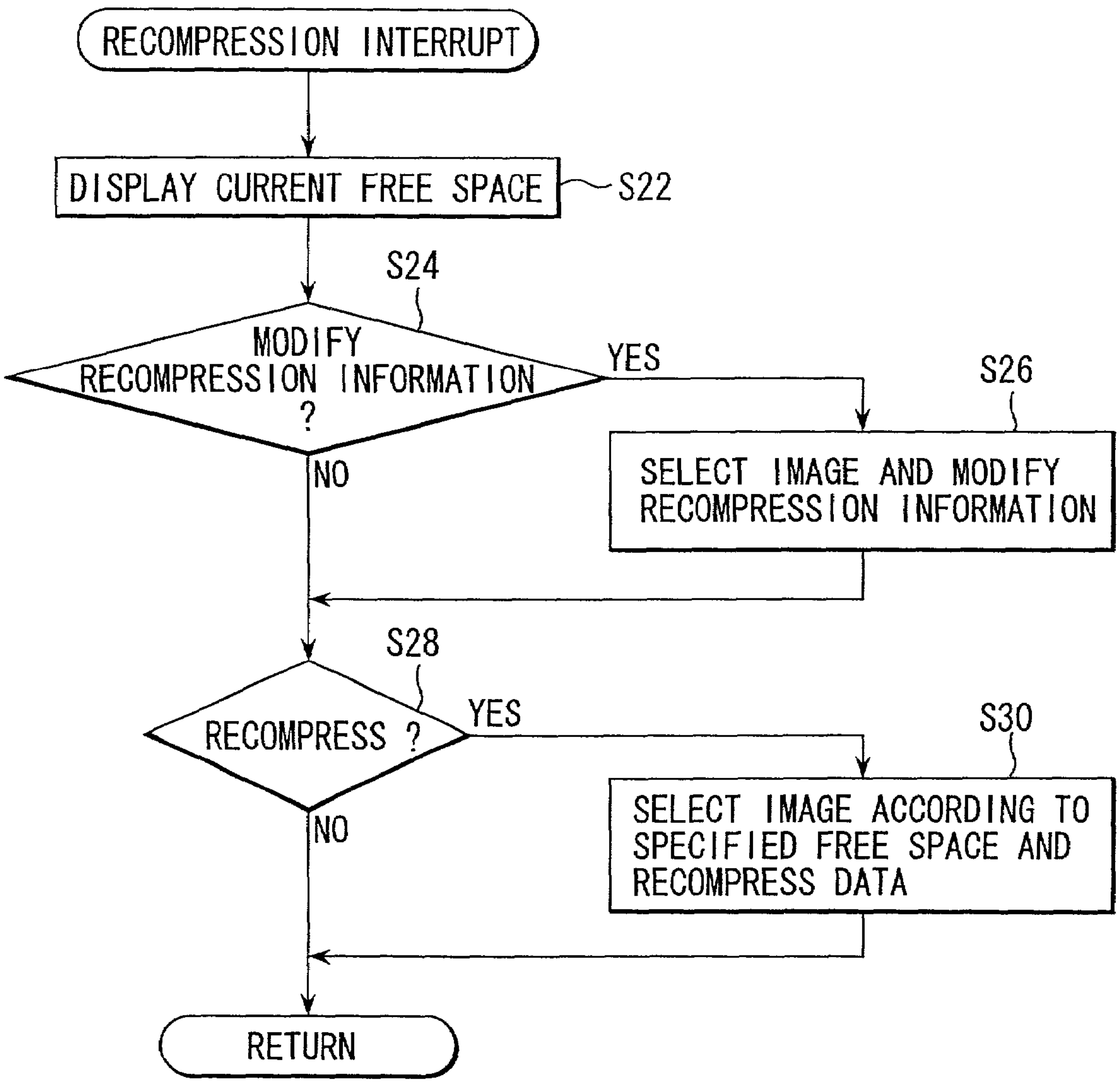
FIG. 5 is a flowchart showing a recompression operation.
Figure 6:
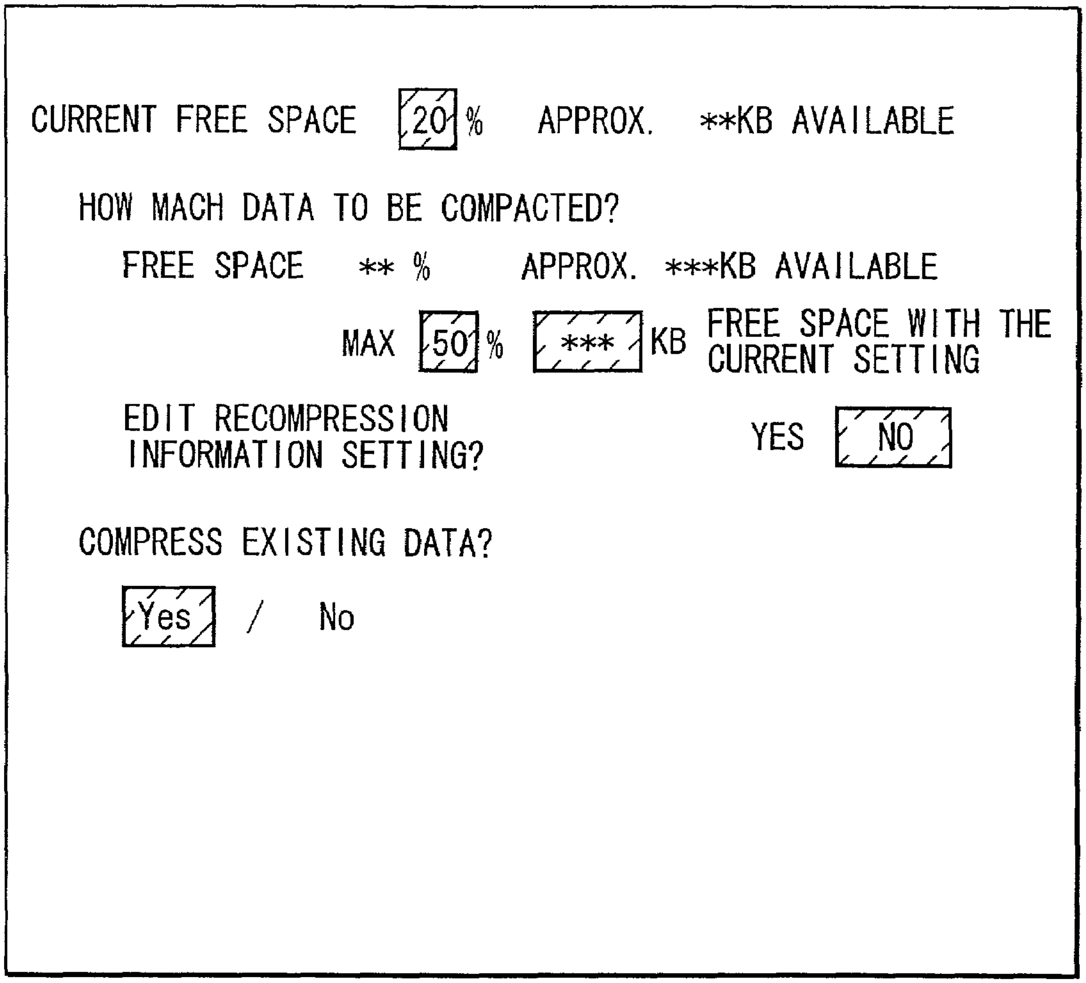
FIG. 6 shows a user interface screen for recompression.

It is possible to specify recompression at any timing in this image pickup flow. For example, the operation section 10 is provided with a recompression key. Operating this key causes a recompression interrupt as shown in FIG. 5. When this interrupt occurs, the current free space for the storage apparatus 11 is displayed at step S22. This is displayed as a recompression execution screen as shown in FIG. 6. This screen shows that the current free space is 20% and the available size is approximately ** KB.

Although it is possible to perform recompression by using the recompression ratio as set in FIG. 4, this recompression ratio is the maximum allowable value. With this condition unchanged, data may be recompressed at a higher rate than is needed, allocating too large a free space. There may be the case where it is necessary to allocate a free space larger than that obtained from the compression at the set compression ratio. To solve this, it is inquired whether the recompression setting should be changed or not (step S24 in FIG. 5). For this purpose, the screen shows an approximate free space when data is recompressed at the currently set recompression ratio. This example shows that the free space of 50% (approximately *** KB) is allocated.

Figure 7:
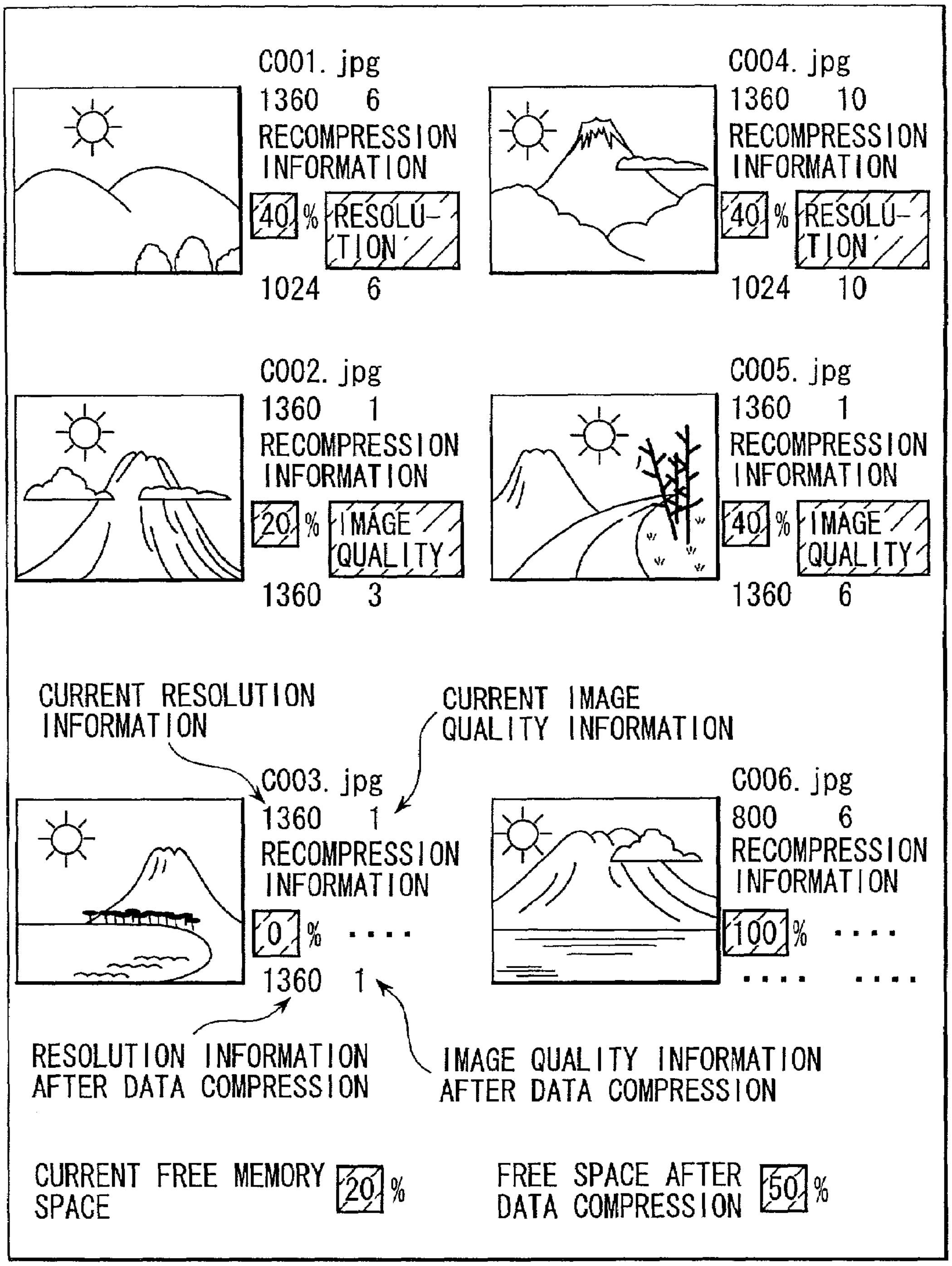
FIG. 7 shows a user interface screen for changing recompression information.

When a change is needed, a recompression information change screen as shown in FIG. 7 is displayed at step S26. This example shows six thumbnail images. Next to each image, there are displayed an image file name, current resolution and image quality information, recompression information (recompression ratio, priority compression method), and resolution and image quality information after recompression. These pieces of information are used for selecting an image whose recompression information is to be changed and changing the recompression information. When an intended free space is smaller than or equal to the free space available at the current setting, it is necessary to select an image to be recompressed or change the current compression ratio to a larger value. It may be a good practice to first select an image with a large recompression ratio and compress this image. Alternatively, it may be preferable to uniformly increase the compression ratio assigned to each frame.

When the "compression of existing data" is submitted on the recompression execution screen in FIG. 6 (step S28), the recompression is performed at step 30 according to the compression information specified for each image. An image compressed in the JPEG format is once decompressed to the original image, and then is recompressed. Decompression to the original image is performed with reference to the compression history stored in the image data profile.

The additional information about recompression may be changed at any time after image pickup rather than just before the recompression at step S26.

As mentioned above, the first embodiment increases a free space in the storage apparatus without deleting data through the use of recompression. It is possible to additionally save new image data if a new replaceable storage medium is not available, e.g., at a place where one has gone, or if data cannot be transferred to other apparatuses. Since the recompression ratio is specified for each frame, it is possible to modify the recompression ratio as needed, enabling recompression according to situations.

While the description above refers to a particular embodiment of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the description above refers to image data. However, the present invention is likewise applicable to other data, such as music data. In the case of music data, changing a compression ratio is equivalent to changing a sampling rate or a frequency band instead of changing the resolution or the image quality. When DVD-RAM is used as a storage apparatus for image data, changing a compression ratio is equivalent to changing the number of quantization bits or the Huffman code table.

The above-mentioned additional information is rather large because the recompression ratio can be fine-tuned. The additional information is simplified down to three bits. Namely, the compression ratio is expressed in two bits for four settings: "00" for no compression, "01" for up to 25% compression, "10" for up to 50% compression, and "11" for up to 75% compression. The priority compression method is expressed in one bit: "0" for resolution priority and "1" for image quality priority.

Moreover, the present invention can also be implemented as a computer readable recording medium in which is recorded a program for allowing a computer to execute predetermined means, allowing the computer to function as predetermined means, or allowing the computer to realize a predetermined function.

What is claimed is:

1. An apparatus comprising:

a storage device configured to store digital data;

an input device configured to set a compression ratio of the stored digital data;

a writing device configured to write the set compression ratio as one item of additional data for the stored digital data to said storage device; and a display device which displays resolution and image quality information after recompression.

2. The apparatus according to claim 1, further comprising:

a compression device configured to compress the stored digital data in accordance with the compression ratio.

3. The apparatus according to claim 1, wherein said writing device writes the compression ratio before or after said storage device stores the digital data.

4. The apparatus according to claim 1, wherein said writing device changes the compression ratio after said storage device stores the digital data.

5. The apparatus according to claim 1, wherein said storage device stores a plurality of frames of compressed image data;

said input device sets a recompression ratio of the compressed image data stored in said storage device for each frame; and said writing device writes the set recompression ratio for each frame as another item of the additional data in said storage device, said apparatus further comprising:

a device configured to recompress the compressed image data stored in said storage device according to the compression ratio and store the recompressed data in said storage device.

6. The apparatus according to claim 1, wherein said storage device saves compressed music data comprising a plurality of tunes;

said input device sets a recompression ratio of the compressed music data stored in said storage device; and said writing device writes the set recompression ratio for each tune as another item of the additional data in said storage device, said apparatus further comprising:

a device configured to recompress the compressed music data stored in said storage device according to the compression ratio and store the recompressed data in said storage device.

7. An article of manufacture comprising a computer usable medium having computer readable program code means embodied therein, the computer readable program code means comprising:

computer readable program code means for causing a computer to store digital data;

computer readable program code means for causing a computer to set a compression ratio of the stored digital data;

computer readable program code means for causing a computer to write the set compression ratio as additional data for the stored digital; and computer readable program code means for causing a computer to display resolution and image quality information after recompression.

8. The article of manufacture according to claim 7, further comprising:

computer readable program code means for causing a computer to compress the stored digital data in accordance with the compression ratio.

9. The article of manufacture according to claim 7, wherein said writing computer readable program code means causes a computer to write the compression ratio before or after storing the digital data.

10. The article of manufacture according to claim 7, wherein said writing computer readable program code means causes a computer to change the compression ratio after storing the digital data.

11. The article of manufacture according to claim 7, wherein said storing computer readable program code means causes a computer to store a plurality of frames of compressed image data;

said input computer readable program code means causes a computer to set a recompression ratio of the stored compressed image data for each frame; and said writing computer readable program code means causes a computer to write the set recompression ratio for each frame as another item of the additional data, said apparatus further comprising:

computer readable program code means for causing a computer to recompress the stored compressed image data according to the compression ratio and store the recompressed data.

12. The article of manufacture according to claim 7, wherein said storage computer readable program code means causes a computer to save compressed music data comprising a plurality of tunes;

said input computer readable program code means causes a computer to set a recompression ratio of the stored compressed music data; and said writing computer readable program code means causes a computer to write the set recompression ratio for each tune as another item of the additional data, said apparatus further comprising:

computer readable program code means for causing a computer to recompress the stored compressed music data according to the compression ratio and store the recompressed data.

* * * * *